United States Patent Office 3,348,310
Patented Oct. 24, 1967

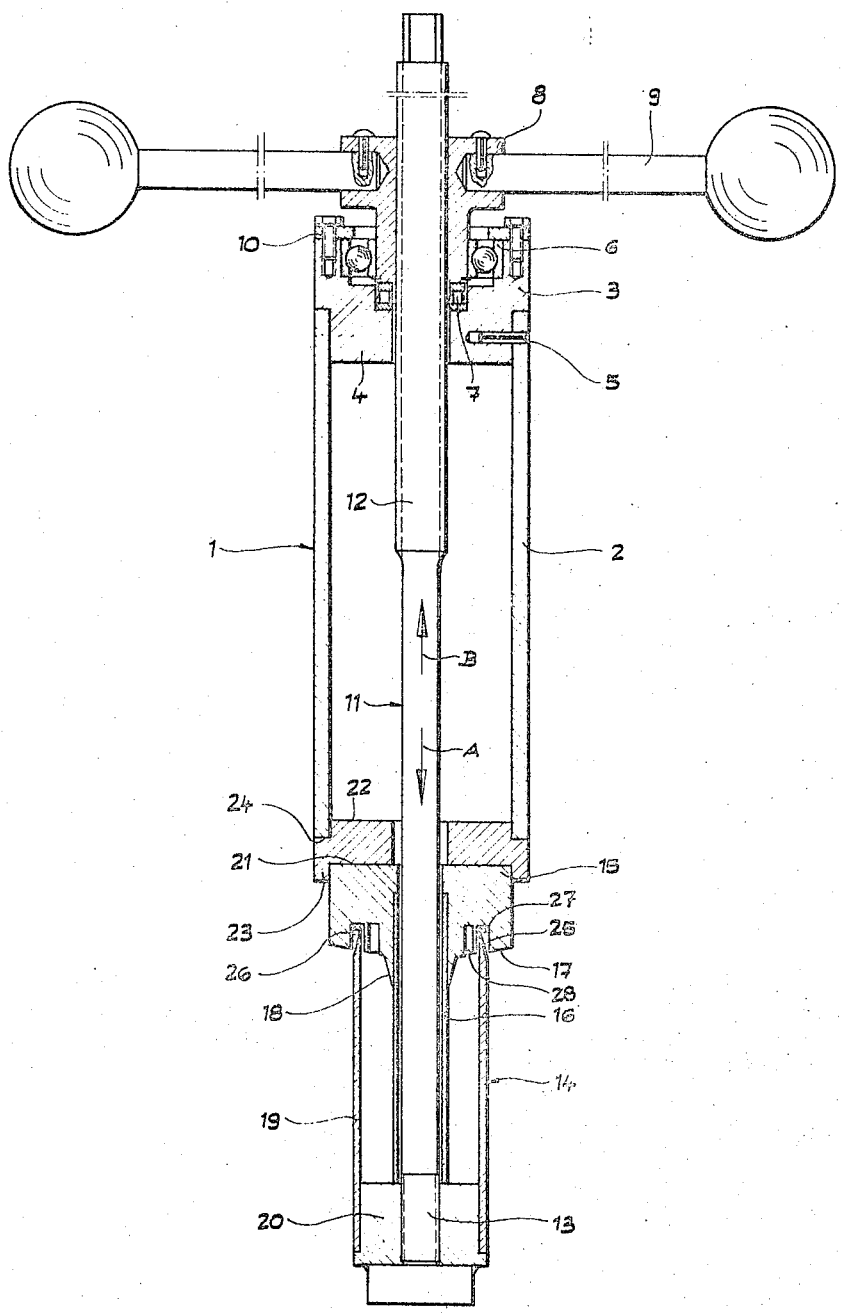

3,348,310
CUTTING TOOL FOR REPAIRING ARTICLES
Georg Gottauf, Munich, Germany, assignor to Stahlgruber Otto Gruber & Co., Munich, Germany, a company of Germany
Filed Feb. 9, 1966, Ser. No. 526,240
Claims priority, application Germany, Feb. 26, 1965, St 23,420
9 Claims. (Cl. 30—360)

ABSTRACT OF THE DISCLOSURE

A cutting tool for removing cylindrical pieces from a damaged object such as a motor vehicle tire including a guide tube or housing which has a spindle axially movable therein with a cutting tool being secured to the end of the spindle upon the guide tube or housing. The cutting tool is placed on one side of the damaged object with the spindle being inserted through the object. An abutment on the guide tube or housing is on the other side of the damaged object. By manipulating the spindle, the cutting tool moves toward the abutment to cut the damaged object and thereby prepare it for repair.

---

This invention relates to cutting tools used for repairing vulcanized rubber articles, such as motor vehicle tires and the like.

Preparatory to the repair of rubber objects, e.g., motor vehicle tires, having large ruptures, a funnel-shaped cutout was heretofore made at the damaged spot. The cutout has sometimes either been made from only one side of the tire but often also from both sides. This cutout is then filled with a vulcanized rubber mass or with a prefinished repair body. Since cutting out the funnel-shape in the damaged spot requires special knowledge and skill, this work could only be done by experienced vulcanizers. As a result processes have been introduced according to which a damaged spot was cut out with a knife, not conically but cylindrically. These processes are particularly suitable for repairs with preformed repair bodies which have a shape fitted to the shape of the cutout. The cylindrical cutout is necessary in order to reinforce the damaged spot itself, as well as the rip extending therefrom, and the torn off tissue parts, particularly with respect to thick-walled rubber objects reinforced with piles of tissue. This cutout has been produced according to a known process by a concave object with knife-like or toothed edge, which when clamped into a boring machine or the like cuts the damaged spot in such a manner as to produce a cylindrical hole during the rotation and the forward thrust of the tool.

A successful approach at forming cutouts has been by the insertion of cylindrical or bell-shaped round knives clamped in boring machines. This type of tool has been successful in cases where the cutouts are not too large in diameter and where the rubber article being repaired is thin-walled. However, when the diameter of the cutting tube is increased, for instance when a cutout of 20 mm. or more must be made, and when thicker and more sturdy rubber objects (e.g., motor vehicle tires with many reinforcement linings) must be worked on, it becomes impossible to handle the boring machine without the use of auxiliary devices. These auxiliary devices are necessary because the surface friction in the hole cutout at the inner and outer sheathing of the round knife becomes so great that the driving machine is carried along. Furthermore, the cutting tool becomes so hot that the rubber, in the area of the cutout, is burned and to a certain extent becomes useless for the succeeding vulcanization bonding with the later introduced repair body. In the preparation of a cutout of 20–35 mm. diameter, for example, in thick-walled bodies to be repaired, an auxiliary force is necessary which must hold the driving machine. However, since motor vehicle tires with 50 reinforcement layers are available in commerce and since the present-day repair processes require cutouts of the damaged spot up to a diameter of 75 mm., it is no longer possible with the known tools to achieve satisfartory, true-to-size nutouts whidh do not affect the rubber in the surrounding area of the cut.

Furthermore, it is important in the preparation of rubber articles for repair, particularly with respect to motor vehicle tires, that the cutout be made exactly along the axis of the defect. This requirement, however, necessitates a precise guiding of the cutting tool. In the very high friction forces appearing in the employment of known processes, the precise guiding becomes very difficult, and even centralizing pins lose their effectiveness.

An object of this invention is to provide a cutting tool for use in repairing articles which overcomes the above indicated disadvantages.

A further object is to provide such a tool which can be effectively used with thick walled rubber objects having reinforcing inserts.

Novel features and advantages of the present invention will become apparent to one skilled in the art from a reading of the following description in conjunction with the accompanying drawing wherein the single FIGURE is a cross-sectional view of one embodiment of this invention.

As indicated in the drawing the spindle holder or guide tube, generally designated by 1, is one of the two main parts of the device according to the invention. Holder 1 consists of a tubular housing 2 open at one end. The closed end of housing 2 forms a bearing body 3. The reduced section 4 of body 3 inserted into the housing 2, is connected to the housing by means of slotted pin 5, for example. Bearing body 3 accommodates two roller bearings in respective grooves. These bearings are shown, for example as a radial bearing 6 and an axial bearing 7. The inner rings of these bearings support a spindle nut 8 at its circumference and at its inner front surface. One or more toggles 9 are secured, as handles, to the spindle nut. The radial bearing 6 is held in body 3 by a bearing cover 10.

The spindle which is generally designated by 11, is at one end provided with a winding or threaded portion 12 extending along a considerable part of its length and through the spindle nut 8. The opposite end of spindle 11 is also threaded at 13. By turning the spindle nut or spindle holder 8 with the aid of toggles 9, spindle 11 can be moved up and down in the direction of arrows A–B. In other words the end of spindle 11 provided with screw threading 13 can be moved toward and away from housing 2.

The cutting device of the apparatus is generally designated by 14 and constitutes the second main part of the novel device. This second main part 14 consists of an abutment 15 and the guiding tube 16 coaxially connected thereto. The transition member between the abutment surface 17 and the guiding tube 16 is advantageously formed as a centering cone 18. The cutting device 14 also includes cutting tube 19 and is cutting tube holder 20.

In practice, guide tube 16 is pressed through the rip or hole-shaped damaged spot with the centering cone 18, in turn, being pressed into tight engagement with the mouth of the damaged spot. The intermediate disc 22, which is provided with a hole or slot corresponding to the spindle diameter, is set upon the frontal exposed surface 21 of abutment 15. Disc 22 is centered by means of its ring attachment or annular skirt 23 on abutment 15. Spindle holder 1 with housing 2 is next centered in recess 24 of the intermediate disc 22. Spindle 11 had, in the meanwhile, been turned in the direction of arrow A to such an extent that its end having the screw threading 13 extends beyond the lower frontal surface of the guiding tube 16. Next, cutting tube holder 20 with the cutting tube 19 is screwed on the spindle end from below (for instance, in a tire repair, holder is applied from the interior surface of the tire), so that the rubber object to be repaired and from which the damaged spot is to be cut out is disposed between the abutment surface 17 of the abutment 15 and the ring sheath 25 of the cutting tube 19. By turning the toggles 9, spindle 11 is then moved in the direction of arrow B, i.e., into the housing. Since the cutting tube is attached to end 13, the cutting tube is thus carried along, being easily pulled through the rubber of the body to be repaired. This cutting through the rubber body is effectively accomplished even where the body is reinforced with inserts. Since the guiding tube follows the axis of the damaged spot and guides the spindle in its movement, the cut produced by the cutting tube 19 will take a course coaxial to the axis of the guiding tube.

Accordingly, after the cutting through of the material to be repaired, even the last thin layer which is ordinarily extremely difficult to cut through smoothly, is also severed. The cutter 25 of the cutting tube can then enter annular space 26 extending from the surface of the abutment and which adjoins the surface of the object to be repaired.

Advantageously, this annular space is provided with a washer 27 made of plastic or some other suitable flexible or resilient material for the protection of cutting edge 25. Another safeguard is that the path of cutting tube 19 is limited. In this sense during the movement of the spindle in the direction of arrow B, the front surface of the cutting tube holder 20 comes to rest against the frontal surface of the guiding tube 16 (near threaded portion 13) when the cutting edge 25 of cutting tube 19 has entered annular space 26.

As soon as the damaged spot had been cut out of the object to be repaired, the spindle 11 is screwed back in the direction of arrow A until the intermediate disc 22 can be taken out. After the disc 22 is removed, cutting tube 19 is completely withdrawn by turning the spindle through the material to be repaired. During this movement the front surface of the housing is supported on the side facing the cutting tube, against the object to be repaired.

The removal of the rubber or rubber-tissue cutout takes place in such a manner that the cutting tube holder 20 is screwed off spindle 11, whereupon the cutout can then be withdrawn from the loose cutting tube.

The device of the invention also permits the use of cutting tubes of various diameters, if correspondingly constructed cutting tube holders are provided. For example, sets of members with various diameters can be provided or else a single member designed for accommodating various diameters. These varied or staggered diameters may for example include the lowest step designated for a cutting tube having largest diameter, and the highest step being designated for that with the smallest diameter. The device shown in the drawing can, for example, be provided with two ring or annular areas 26 and 28 for accommodating two cutting tubes of different tubes of differing diameter. Alternatively, the ring step remaining between both ring spaces can also be left out so that annular areas 26 and 28 are connected to form one continuous area.

The scope of the invention makes various modified arrangements both conceivable and possible. The spindle drive shown in the drawing is therefore only one possible embodiment. Friction bearings can be provided in place of the roller bearings or a combined roller-friction bearing system can also be used. The spindle nut can also be operated with a ratchet-like jack mechanism instead of by means of toggles.

Obviously, many modifications and variations of the present invention are possible in the light of the above teachings. It is, therefore to be understood that within the scope of the appended claims the invention may be practiced otherwise than as specifically described.

What is claimed is:

1. A cutting tool for removing cylindrical pieces from a damaged object comprising a guide tube, a spindle disposed in said guide tube for axial movement therein, an abutment mounted at one end of said guide tube, a cutting tool, means connecting said cutting tool to said spindle for moving said cutting tool in accordance with the movement of said spindle and for thereby moving said cutting tool toward said abutment whereby said abutment may be placed on one side of the damaged object with said spindle inserted through the damaged object and said cutting tool being on the other side of the damaged object so that said cutting tool cuts through said damaged object when it is moved toward said abutment by the movement of said spindle, and said guide tube being provided with centering means for accurately positioning said guide tube so that said spindle may accurately penetrate the damaged area of the object.

2. A cutting tool as set forth in claim 1 wherein a boss is provided on said abutment projecting away from said guide tube, an aperture being through said boss for the passage of said spindle therein, said boss tapering from said aperture toward said abutment to provide a conical-like surface, and said conical-like surface comprising said centering means.

3. A cutting tool for removing cylindrical pieces from a damaged object comprising a guide tube, a spindle disposed in said guide tube for axial movement therein, an abutment mounted at one end of said guide tube, a cutting tool, means connecting said cutting tool to said spindle for moving said cutting tool in accordance with the movement of said spindle and for thereby moving said cutting tool toward said abutment whereby said abutment may be placed on one side of the damaged object with said spindle inserted through the damaged object and said cutting tool being on the other side of the damaged object so that said cutting tool cuts through said damaged object when it is moved toward said abutment by the movement of said spindle, said means for connecting said cutting tube to said spindle including threaded means on said spindle, a cutting tube holder threadably connected with said threaded means, and said cutting tube being mounted on said holder.

4. A cutting tool for removing cylindrical pieces from a damaged object comprising a guide tube, a spindle disposed in said guide tube for axial movement therein, an abutment mounted at one end of said guide tube, a cutting tool, means connecting said cutting tool to said spindle for moving said cutting tool in accordance with the movement of said spindle and for thereby moving said cutting tool toward said abutment whereby said abutment may be placed on one side of the damaged object with said spindle inserted through the damaged object and said cutting tool being on the other side of the damaged object so that said cutting tool cuts through said damaged object when it is moved toward said abutment by the movement of said spindle, and said abutment being provided with at least one annular groove disposed toward said cutting tube whereby said cutting tube may penetrate therein after cutting through the damaged object.

5. A cutting tool as set forth in claim 4 wherein a flexible disc is inserted in at least one of said annular grooves for preventing damage to said abutment by said cutting tube.

6. A cutting tool as set forth in claim 4 wherein said grooves include a plurality of concentric grooves for selectively receiving said cutting tube in accordance with the size of said cutting tube.

7. A cutting tool for removing cylindrical pieces from a damaged object comprising a guide tube, a spindle disposed in said guide tube for axial movement therein, an abutment mounted at one end of said guide tube, a cutting tool, means connecting said cutting tool to said spindle for moving said cutting tool in accordance with the movement of said spindle and for thereby moving said cutting tool toward said abutment whereby said abutment may be placed on one side of the damaged object with said spindle inserted through the damaged object and said cutting tool being on the other side of the damaged object so that said cutting tool cuts through said damaged object when it is moved toward said abutment by the movement of said spindle, said guide tube being open at one end and closed at the other end, said closed end being formed as a bearing body, a rotatable spindle holder being secured in said bearing body for movement there against, and said spindle being mounted in said spindle holder.

8. A cutting tool for removing cylindrical pieces from a damaged object comprising a guide tube, a spindle disposed in said guide tube for axial movement therein, an aubtment mounted at one end of said guide tube, a cutting tool, means connecting said cutting tool to said spindle for moving said cutting tool in accordance with the movement of said spindle and for thereby moving said cutting tool toward said abutment whereby said abutment may be placed on one side of the damaged object with said spindle inserted through the damaged object and said cutting tool being on the other side of the damaged object so that said cutting tool cuts through said damaged object when it is moved toward said abutment by the movement of said spindle, one end of said guide tube being open, a removable disc being inserted in said one end of said guide tube, an aperture being in said disc for the passage of said spindle therethrough, and said disc being mounted upon said abutment.

9. A cutting tool for removing cylindrical pieces from a damaged object comprising a guide tube, a spindle disposed in said guide tube for axial movement therein, an abutment mounted at one end of said guide tube, a cutting tool, means connecting said cutting tool to said spindle for moving said cutting tool in accordance with the movement of said spindle and for thereby moving said cutting tool toward said abutment whereby said abutment may be placed on one side of the damaged object with said spindle inserted through the damaged object and said cutting tool being on the other side of the damaged object so that said cutting tool cuts through said damaged object when it is moved toward said abutment by the movement of said spindle, said guide tube being open at one end, a bearing body being inserted in the closed end of said guide tube, an axial aperture in said bearing body, a rotatable spindle holder being inserted in said axial aperture, an axial aperture in said spindle holder, threaded means on said spindle and said spindle holder whereby said spindle and said spindle holder are threadably engaged, handle means on said spindle holder for causing relative movement between said spindle and said spindle holder, a removable disc being inserted in the open end of said guide tube, an axial opening in said removable disc to permit the passage of said spindle therethrough, said abutment being received in said removable disc, a centering cone on said abutment disposed remote from said removable disc for centering said guide tube with respect to the damaged area of the object, an annular groove in said abutment for receiving said cutting tube, a flexible washer in said groove for preventing damage to said abutment, a guiding tube secured to said abutment and extending therefrom, said spindle being inserted through said abutment and in said guiding tube with a portion of said spindle being exposed from said guiding tube, said exposed portion of said spindle having threaded means thereon, a cutting tube holder supporting said cutting tube, threaded means on said cutting tube holder engaging said threaded means on said exposed portion of said spindle, and said cutting tube holder and its threaded means and threaded means on said exposed portion of said spindle comprising said means connecting said spindle to said cutting tube.

References Cited
UNITED STATES PATENTS

| | | | |
|---|---|---|---|
| 2,221,904 | 11/1940 | Abramson et al. | 30—360 |
| 2,633,197 | 3/1953 | Nischan | 30—360 |

OTHELL M. SIMPSON, *Primary Examiner.*